United States Patent Office 3,152,105
Patented Oct. 6, 1964

3,152,105
POLYMERIZATION OF α-OLEFINS UTILIZING A HALOGEN FREE CATALYST CONTAINING WATER
Wendell P. Long, Wilmington, Del., assignor to Hercules Powder Company, Wilmington, Del., a corporation of Delaware
No Drawing. Filed Aug. 16, 1960, Ser. No. 49,849
19 Claims. (Cl. 260—88.2)

This invention relates to an improved process for the polymerization of α-olefins under relatively mild conditions of pressure and temperature whereby it is possible to obtain polymers that are free from halogen residues.

It is known to polymerize ethylene to a high molecular weight polyethylene under relatively mild conditions of temperature and pressure by using as the catalyst for the polymerization a mixture of a compound of a metal of Groups IV–B, V–B, VI–B or VIII of the Periodic Table or manganese, in combination with an organometallic compound of an alkali metal, alkaline earth metal, zinc, earth metal or rare earth metal.

While the above-described catalysts broadly include a great number of combinations, the specific catalysts most often mentioned in the prior art contain halogen in one or both components. This is because it has been found as a general rule that those catalyst combinations containing halogen in one form or another are much more active than catalysts that contain no halogen. The employment of a halogen-containing catalyst, however, is subject to the disadvantage that halogen residues will be present in the crude polymer. These halogen residues, if allowed to remain in the polymer, will corrode metal equipment employed in end-use fabrication processes and can promote heat and oxidative degradation of the polymer. Consequently, it is usually necessary to purify the polymer to remove halogen residues, a procedure that adds considerably to the cost of the polymer.

It has now been discovered that the combination of a carboxylic acid salt of chromium, water, and either a trialkylaluminum or a dialkylaluminum hydride is a highly active and efficient catalyst for the polymerization of α-olefins.

Accordingly, the present invention relates to the process of polymerizing α-olefins which comprises contacting at least one α-olefin with a catalyst comprising a combination of a carboxylic acid salt of chromium, an alkylaluminum compound selected from the group consisting of trialkylaluminums and dialkylaluminum hydrides, and water.

Before discussing the invention in greater detail, the following examples are presented for purposes of illustration, parts and percentages being by weight unless otherwise specified. The molecular weight of the polymers in the examples is indicated by the reduced specific viscosity given therein. By the term "reduced specific viscosity" (RSV) is meant the specific viscosity divided by the concentration of the solution in grams per 100 ml. measured at 135° C. on a solution in decahydronaphthalene containing 0.1 gram of the polymer in 100 ml. of the solution. Rates of polymerization, where given, are in terms of p.s.i. drop per minute in a closed polymerization vessel. In every example the diluent and combined catalyst occupy approximately ⅓ the volume of the polymerization vessel. Melting points, where given, are determined by loss of birefringence.

EXAMPLES 1–5

A series of polymerizations were conducted to determine the operable ratios of water to alkylaluminum compound when using trivalent chromium salts as a component of the catalyst.

Each vessel was evacuated and flushed with nitrogen and then charged with 433 parts of toluene containing various amounts of water. The catalyst was formed in situ by adding 0.62 part of chromic acetate and 1.04 parts of triethylaluminum. Each vessel was closed, the nitrogen withdrawn by vacuum and ethylene admitted to a pressure of 15 p.s.i. g. Each vessel was maintained at room temperature for 11 minutes and the polymerization quenched with 4.0 parts of ethanol. Each polymer was separated by filtration, washed with ethanol and dried under vacuum at 60° C. overnight. The parts of water used, ratio of water to triethylaluminum, rates of polymerization, parts of polymer obtained and the RSV of each polymer are given in Table I.

Table I

| Example No. | 1 | 2 | 3 | 4 | 5 |
|---|---|---|---|---|---|
| Parts water used | 0 | 0.036 | 0.072 | 0.108 | 0.144 |
| Water/triethylaluminum | 0 | 0.2 | 0.4 | 0.6 | 0.8 |
| Rate (p.s.i. drop/min.) | 0.06 | 0.23 | 1.8 | 1.1 | 0.51 |
| Polymer: | | | | | |
| Parts | 0.058 | 1.25 | 6.30 | 6.05 | 1.88 |
| RSV | 13.8 | 7.2 | 7.1 | 14.7 | 3.8 |

EXAMPLES 6–11

A series of polymerizations were conducted to determine the operable ratio of water to alkylaluminum compound when using divalent chromium salts as components of the catalyst.

Each vessel was evaluated and flushed with nitrogen and then charged with 433 parts of toluene containing various amounts of water and 1.98 parts of triisobutylaluminum added. Each vessel was closed and the nitrogen withdrawn by vacuum and ethylene admitted to a pressure of 15 p.s.i.g. Then 0.042 part of red chromous α-methylvalerate was added to each vessel and each polymerization maintained at 25° C. for 15 minutes. The polymerizations were quenched with 4 parts of ethanol. Each polymer was isolated as described in Examples 1–5.

The parts of water used, ratio of water to triisobutylaluminum, rates of polymerization, parts of polymer obtained and the RSV of each polymer are given in Table II.

Table II

| Example No. | 6 | 7 | 8 | 9 | 10 | 11 |
|---|---|---|---|---|---|---|
| Parts water used | 0 | 0.072 | 0.108 | 0.144 | 0.18 | 0.216 |
| Water/triisobutylaluminum | 0 | 0.4 | 0.6 | 0.8 | 1.0 | 1.2 |
| Rate (p.s.i. drop/min.) | <0.01 | 0.10 | 0.32 | 1.7 | 1.2 | 0.67 |
| Polymer: | | | | | | |
| Parts | | | 0.46 | 2.10 | 2.6 | |
| RSV | | | 1.2 | 2.7 | 5.3 | |

EXAMPLE 12

A polymerization vessel was charged with 433 parts of toluene containing 0.144 part water, 1.04 parts triethylaluminum and 0.025 part chromous acetate. The vessel was pressured at room temperature to 15 p.s.i.g. ethylene and maintained at that pressure by continuously replacing the ethylene polymerized. After 3 hours the polymerization was quenched with 4 parts of ethanol and the polymer isolated as described in Examples 1–5. The polyethylene thus isolated had an RSV of 11.0, a melting point of 132° C., a methyl content by infrared of 0.57% and amounted to 43.3 parts.

EXAMPLES 13 AND 14

Two polymerizations were conducted in 433 parts of toluene containing 0.11 part of water, 1.14 parts of triethylaluminum and a chromium salt. Each vessel was closed, evacuated and pressured to 17 p.s.i.g. ethylene at room temperature. After a certain number of minutes (see tabulation below) the pressure had dropped to 0 p.s.i.g. Then after an additional 75 minutes each polymerization was quenched with 4 parts of ethanol and the polymers isolated as described in Examples 1–5.

The chromium salt and parts used, periods of minutes until pressure dropped to 0 p.s.i.g., parts of polymer obtained and its RSV are tabulated below:

| Example No. | Chromium Salt | Parts Chromium Salt | Period until Pressure Decreased to 0 p.s.i.g. (min.) | Polymer Parts | RSV |
|---|---|---|---|---|---|
| 13 | Chromous benzoate | 0.31 | 18 | 6.37 | 1.5 |
| 14 | Chromous cyclohexane carboxylate. | 0.32 | 45 | 4.08 | 1.9 |

EXAMPLE 15

A polymerization vessel was charged with 433 parts of toluene containing 0.18 part of water, 1.0 part of triethylaluminum and 0.54 part of chromous propionate. The vessel was closed, pressured to 15 p.s.i.g. ethylene and maintained at room temperature. Overnight the pressure decreased to vacuum. The polymerization was quenched with 4 parts of ethanol and the polymer isolated as described in Examples 1–5. The polyethlene thus isolated had an RSV of 17.9 and amounted to 8.2 parts.

EXAMPLE 16

A polymerization vessel was charged with 433 parts of toluene containing 0.072 part of water, 1.12 parts of a mixed salt of chromic stearate and chromic palmitate and 1.0 part triethylaluminum. The vessel was closed, pressured to 17 p.s.i.g. ethylene and maintained at a temperature of 60° C. After 27 minutes the pressure had dropped to 0 p.s.i.g., and the polymerization was quenched with 4 parts of ethanol. The polymer was isolated as described in Examples 1–5. The polyethylene thus isolated had an RSV of 6.6, a melting point of 129° C., a methyl content by infrared of 0.64% by weight and amounted to 3.3 parts.

EXAMPLE 17

A polymerization vessel was charged with 433 parts of toluene containing 0.14 part of water and 2.0 parts of triisobutylaluminum. The vessel was pressured to 20 p.s.i.g. ethylene at 45° C. and 0.031 part chromous 2-ethylhexanoate was added. The pressure was maintained by continuously replacing the ethylene polymerized. After 2 hours the polymerization was quenched with 4 parts of ethanol and the polymer isolated as described in Examples 1–5. The polyethylene thus isolated had an RSV of 2.8, a melting point of 127° C., a methyl content by infrared of 0.98% by weight and amounted to 22.8 parts.

EXAMPLES 18 AND 19

Two polymerizations were conducted in 433 parts of toluene containing water, a dialkylaluminum hydride and 0.083 part of chromous 2-ethylhexanoate. Each vessel was closed, evacuated and pressured to 17 p.s.i.g. ethylene at room temperature. After a certain number of minutes (see tabulation below) the pressure had decreased and each polymerization was quenched with 4 parts of ethanol. The polymers were isolated as described in Examples 1–5.

The dialkylaluminum hydride and parts used, parts of water, time elapsed from the start of the polymerization until the ethanol was added, parts of polymer obtained and its RSV are tabulated below:

| Example No. | Dialkylaluminum Hydride | Parts Dialkylaluminum Hydride | Time (min.) | Parts of Water | Polymer Parts | RSV |
|---|---|---|---|---|---|---|
| 18 | Diisobutylaluminum hydride. | 1.42 | 50 | 0.11 | 8.52 | 2.1 |
| 19 | Diethylaluminum hydride. | 0.86 | 95 | 0.22 | 3.46 | 7.1 |

EXAMPLE 20

A polymerization vessel was charged with 433 parts of toluene containing 0.18 part water, 2.0 parts triisobutylaluminum and 0.083 part of chromous 2-ethylhexanoate. The vessel was closed, pressured to 45 p.s.i.g. with propylene and then to 50 p.s.i.g. with ethylene. The polymerization was maintained at room temperature. A pressure of 50 p.s.i.g. was maintained by continuously adding ethylene. After 16 hours the polymerization was quenched with 4 parts of ethanol. A toluene-insoluble copolymer fraction was isolated by filtering, washing with ethanol and then drying. The toluene-insoluble copolymer thus isolated had an RSV of 8.3, contained 10% propylene and amounted to 9.8 parts. A toluene-soluble copolymer fraction was isolated by evaporating the filtrate, washing with ethanol and drying. The toluene-soluble copolymer thus isolated had an RSV of 0.3, contained 35.6 propylene and amounted to 29.0 parts.

The process of this invention is carried out by contacting one or more α-olefins with a catalyst comprising a combination of a carboxylic acid salt of chromium, water and either a trialkylaluminum or a dialkylaluminum hydride.

α-Olefins of any chain length can be polymerized to both homopolymers and copolymers of high molecular weight. Exemplary of the α-olefins that can be polymerized singly or in admixture are ethylene, propylene, butene-1, pentene-1, 3-methylbutene-1, 4-methylpentene-2, etc.

Any carboxylic acid salt of chromium can be used in the process of this invention. Preferably, however, the salt will be that of an aromatic carboxylic acid, a saturated aliphatic acid or a saturated cycloaliphatic acid. Exemplary carboxylic acid salts are salts of aliphatic acids such as chromic acetate, chromous acetate, chromous α-methylvalerate, chromic succinate, chromous propionate, chromic oleate, chromic stearate, chromic palmitate, chromous 2-ethylhexanoate, etc.; salts of aromatic acids such as chromic benzoate, chromous benzoate, chromous phthalate, chromic toluate, etc.; and salts of cycloaliphatic acids such as chromic cyclopentane carboxylate, chromous cyclopentane carboxylate, chromous cyclohexane carboxylate, chromous cyclohexane-1,2-dicarboxylate, etc.

The alkylaluminum component of the catalyst employed in this invention can be either a trialkylaluminum or a dialkylaluminum hydride and is one in which the alkyl radicals each contain from about 1–10 carbon atoms and can be the same or different. Exemplary alkylaluminum compounds are the trialkylaluminums such as trimethylaluminum, triethylaluminum, triisobutylaluminum, tri- n-octyl aluminum, etc.; and the dialkylaluminum hydrides such as diethylaluminum hydride, diisobutylaluminum hydride, diisopropylaluminum hydride, etc.

Water is unique in its beneficial action as the third component of the catalyst; other compounds such as diethyl ether, ethanol, tetrahydrofuran, acetylacetone, acetic acid, etc., when used in the manner water is used in this invention, either retard the activity of the catalyst or have no appreciable effect on catalytic activity.

The catalyst of this invention is readily formed by mixing the carboxylic acid salt of chromium, alkylaluminum compound and water in an inert organic diluent, as for example, an aromatic hydrocarbon such as benzene, toluene, xylene, etc.; an aliphatic hydrocarbon such as hexane, heptane, etc., or a mixture of such diluents. The order of addition of the three components to the inert diluent is immaterial. Furthermore, the catalyst can be preformed, i.e., formed before the polymerization reaction is commenced or it can be formed in situ, i.e., in the presence of an α-olefin under polymerization conditions.

The proportions of the various components of the catalyst can vary considerably. The molar ratio of alkylaluminum compound to carboxylic acid salt of chromium, calculated as aluminum/chromium, can, in general, range from about 1 to about 1,000, more preferably from about 10 to about 200. The amount of water used with respect to the other components depends on the valence state of the chromium salt. In general, when using a trivalent chromium salt, i.e., chromic salt, the molar ratio of water to alkylaluminum compound can range from about 0.05 to about 0.8, more preferably from about 0.4 to about 0.6, and when using a divalent chromium salt, i.e., chromous salt, the molar ratio of water to alkylaluminum compound can range from about 0.5 to about 1.5, more preferably about 0.8 to about 1.2.

The actual catalyst is more probably a reaction product of the three components. The exact composition and structure of the catalyst is not known, but it is believed that the water preferentially reacts with the alkylaluminum compound and then the product resulting from that interaction reacts with or is complexed with the chromium salt.

The polymerization can be carried out in a wide variety of ways as, for example, either as a batch or continuous operation. The most convenient and preferred procedure is to prepare the catalyst as previously described in an inert organic diluent and then to add an α-olefin alone or together with another α-olefin continuously or intermittently to the diluent. Concentration of catalyst in the diluent is preferably such as to provide from about 5 to about 100 millimoles of alkylaluminum compound and chromium salt combined per liter of diluent. The selection of pressure and temperature used for the diluent will depend on many factors, such as the degree of polymerization desired, etc. In general, the polymerization will be carried out at a temperature in the range of from about −20° C. to about 90° C., but more preferably from about 20° C. to about 60° C. In the same way, while atmospheric pressure or a pressure of only a few pounds can be used, polymerization can be carried out over a wide range of pressure as, for example, from a partial vacuum to about 1,000 p.s.i.g., but most preferably from about 5 to about 100 p.s.i.g. Preferred diluents are the aromatic hydrocarbons such as benzene, toluene, xylene, etc., although other diluents useful in the low pressure polymerization of α-olefins can also be employed. Usually the same diluent is used in the polymerization as is used in the preparation of the catalyst.

The advantages of polymerizing α-olefins according to the process of this invention are apparent. One particular advantage, of course, is the fact that the catalyst does not contain halogen and thus any catalyst residues that remain in the polymer do not cause the polymer to be corrosive to metal or prone to degradation. This means as a practical matter that recovery and purification of the polymer can be materially simplified. However, the catalyst, despite its halogen-free character, has high activity and the ability to retain activity over a substantial period of time.

What I claim and desire to protect by Letters Patent is:

1. The process of polymerizing α-olefins which comprises contacting at least one α-olefin with a catalyst comprising a carboxylic acid salt of chromium, an alkylaluminum compound selected from the group consisting of trialkylaluminums and dialkylaluminum hydrides, and water wherein the molar ratio of water to aluminum in the catalyst is from about 0.05 to about 0.8 when the carboxylic acid salt of chromium is a chromic salt and from about 0.5 to about 1.5 when the carboxylic acid salt of chromium is a chromous salt.
2. The process of claim 1 in which the polymerization is the homopolymerization of ethylene.
3. The process of claim 1 in which the polymerization is the copolymerization of ethylene and propylene.
4. The process of claim 1 in which the alkylaluminum compound is a trialkylaluminum.
5. The process of claim 4 in which the trialkylaluminum is triethylaluminum.
6. The process of claim 4 in which the trialkylaluminum is triisobutylaluminum.
7. The process of claim 1 in which the alkylaluminum compound is a dialkylaluminum hydride.
8. The process of claim 7 in which the dialkylaluminum hydride is diethylaluminum hydride.
9. The process of claim 7 in which the dialkylaluminum hydride is diisobutylaluminum hydride.
10. The process of claim 1 in which the carboxylic acid salt of chromium is chromic acetate.
11. The process of claim 1 in which the carboxylic acid salt of chromium is chromous acetate.
12. The process of claim 1 in which the carboxylic acid salt of chromium is chromous α-methylvalerate.
13. The process of claim 1 in which the carboxylic acid salt of chromium is chromous benzoate.
14. The process of claim 1 in which the carboxylic acid salt of chromium is chromous propionate.
15. The process of claim 1 in which the carboxylic acid salt of chromium is chromous cyclohexane carboxylate.
16. The process of claim 1 in which the carboxylic acid salt of chromium is chromous 2-ethylhexanoate.
17. The process of claim 1 in which the catalyst is formed in situ.
18. The process of claim 1 in which the catalyst is formed before the polymerization reaction is commenced.
19. The process of claim 1 in which the molar ratio of aluminum to chromium in the catalyst is from about 1 to about 1,000.

References Cited in the file of this patent

UNITED STATES PATENTS

| | | |
|---|---|---|
| 2,824,089 | Peters et al. | Feb. 18, 1958 |
| 2,984,658 | Seydel et al. | May 16, 1961 |

FOREIGN PATENTS

| | | |
|---|---|---|
| 534,792 | Belgium | May 2, 1955 |